United States Patent [19]
Grilliot et al.

[11] Patent Number: 5,651,514
[45] Date of Patent: Jul. 29, 1997

[54] RECLINE SAFETY LOCK ASSEMBLY

[75] Inventors: Ronald Grilliot, Plantation; Patrick Murphy, Miami, both of Fla.

[73] Assignee: Aircraft Modular Products, Inc., Miami, Fla.

[21] Appl. No.: 490,797

[22] Filed: Jun. 15, 1995

[51] Int. Cl.$^6$ ................ B64D 25/04; B60N 2/42
[52] U.S. Cl. ........... 244/122 R; 244/121; 297/216.14; 297/216.15; 297/216.19; 297/216.2; 297/378.11
[58] Field of Search ............... 244/121, 122 R; 297/216.14, 216.15, 216.16, 216.19, 216.2, 216.17, 378.11

[56] References Cited

U.S. PATENT DOCUMENTS

| | | | |
|---|---|---|---|
| 5,265,937 | 11/1993 | Allen | 297/378.11 |
| 5,320,308 | 6/1994 | Bilezikjian et al. | 244/122 R |
| 5,370,440 | 12/1994 | Rogala | 297/216.14 |
| 5,454,622 | 10/1995 | Demopoulos | 297/216.14 |
| 5,460,429 | 10/1995 | Whalen | 297/378.11 |
| 5,507,553 | 4/1996 | Nishizawa et al. | 297/216.14 |

FOREIGN PATENT DOCUMENTS

| | | | |
|---|---|---|---|
| 4-303034 | 10/1992 | Japan | 297/216.14 |

*Primary Examiner*—Andres Kashnikow
*Assistant Examiner*—Virna Lissi Mojica
*Attorney, Agent, or Firm*—Malloy & Malloy, P.A.

[57] ABSTRACT

A recline safety lock assembly to be secured to an aircraft passenger seat of the type including a reclining seat back portion, a seat foundation and at least one recline cylinder structured to permit reclining of the seat back portion. The recline safety lock assembly includes at least one lock plate having an upper mount portion to be secured to a side rail of the seat back portion, and an engagement end having a downwardly depending lip formed therein. Additionally, the assembly includes at least one lock pin having a main shaft with a transverse notch formed therein. The lock pin is rotatably and axially mounted adjacent the engagement end of the lock plate and is rotatable between a disengaged orientation and an engaged orientation. In the engaged orientation the transverse notch is in a generally upwardly angled orientation such that the lock pin engages the downwardly depending lip of the lock plate and rear reclining of the seat back portion relative to the seat foundation portion is prevented. Conversely, the disengaged orientation includes the transverse notch disposed in a generally horizontal orientation so as to permit free passage of the downwardly depending lip of the lock plate therethrough and to permit normal reclining of the seat back portion relative to the seat foundation portion.

10 Claims, 2 Drawing Sheets

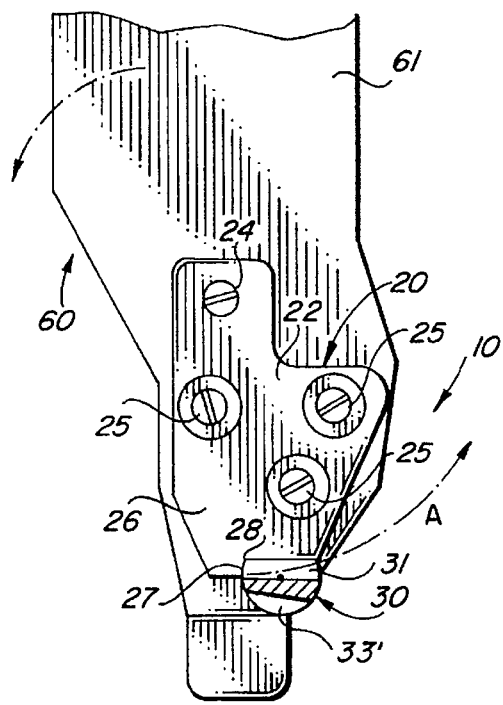
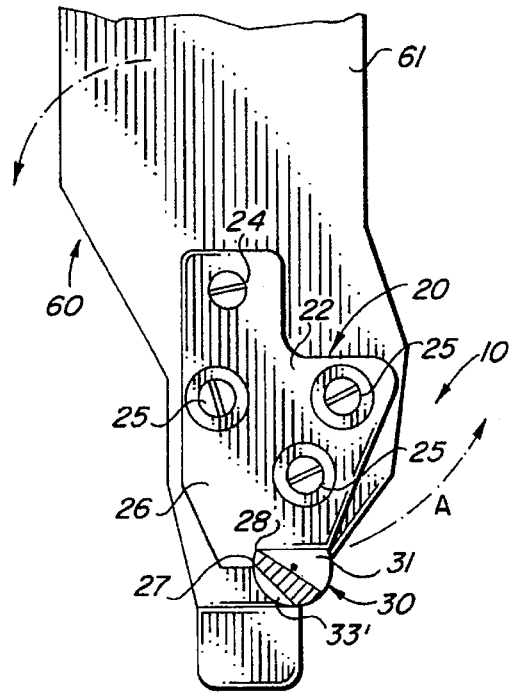
FIG-4
FIG-5
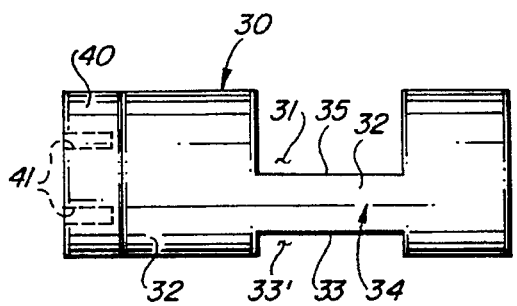
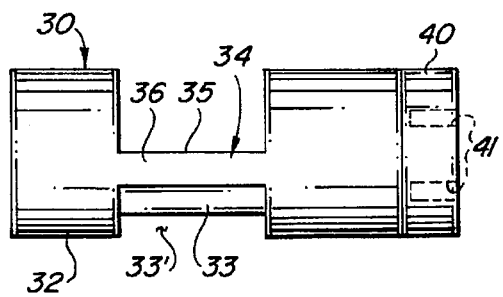
FIG-6
FIG-7
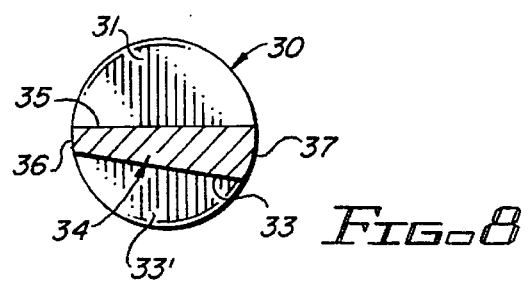
FIG-8 ns. 5,651,514

RECLINE SAFETY LOCK ASSEMBLY

BACKGROUND OF THE INVENTION

1. Field of the Invention

To be disposed on an aircraft passenger seat, and especially an aft facing aircraft passenger seat, a recline safety lock assembly which does not add a substantial amount of complex, cost, and/or heavy additional parts to existing seat frame designs, but which functions to substantially prevent rear reclining of a seat back portion of the aircraft seat during an (FAA) crash test wherein a substantial reclining load is exerted on the seat back portion.

2. Description of the Related Art

The Federal Aviation Association (FAA) places very strict requirements and guidelines on the structures of all aircraft as well as aircraft components, and including aircraft passenger seats. Aircraft passenger seats in particular are subjected to a number of different FAA tests designed to assure that the aircraft seat will be reasonable safe in a crash scenario, and these tests frequently expose weaknesses in the structural makeup of the aircraft seat. Most passenger seats in aircraft will recline, and it is known that the area where the seat back pivotally connects to the seat foundation is susceptible to weakening and failure during a crash testing. Thus, certain FAA tests focus on the ability of the seat back portion to be maintained in its upright position during a simulation of a crash.

At least one FAA test simulates a forward moving aircraft involved in a crash, and the resulting, substantial impact forces will act to propel the seat back portion of a passenger seat in a forward direction. In most commercial aircraft, all passenger seats usually face the front of the aircraft and for this reason, passengers in potential crash situations are instructed to place their seats in a fully upright position. Also, most conventional passenger seats have been specifically structured to resist the forward compressing of the seat back portion upon a substantial crash test load. Generally in the art, in order to provide for appropriate reclining of the seat back portion and securing of the seat back portion in a desired recline orientation, a recline cylinder or like recline mechanism is used. This recline cylinder is secured to the seat side rails of the seat foundation forward of the joint between the side rails of the seat back portion and the seat side rails of the seat foundation portion. This recline cylinder, not only functions to permit the appropriate reclining, but also functions to prevent forward collapsing of the seat back portion. Specifically, the recline cylinder is secured in place to the seat side rails and has a piston like action such that once it is fully compressed (i.e. the seat is in the full upright orientation) the recline cylinder functions to prevent the side rails of the seat back portion from pivoting further forward. In fact, the recline cylinders have proven such an advantage that often a pair of the recline cylinders are used at opposing sides of the seat foundation so as to provide a balanced resistance to the forward pivoting of the seat back portion.

However, in the field of private aircraft, many components are customized, including passenger seats and their arrangement within an aircraft. Frequently, a private aircraft owner will require that some or many passenger seats be placed in an aft facing orientation, contrary to what occurs in commercial aircraft. In the crash situation, the impact forces which act upon an aft facing aircraft passenger seat will still cause the seat back portion to move in a forward direction but given its orientation, the seat back would be propelled into a hyper-reclined position. Additionally, it should be noted that the FAA recently revised several testing standards with the result being in order to pass FAA testing, aircraft passenger seats are now subjected to and must withstand substantially increased crash test forces and loads. Consequently, many existing aircraft passenger seats are not able to pass the new FAA tests, and the effects of the FAA revisions are just now beginning to affect the manufacturers in this specialized art, as well as the choices available to consumers. Presently in the art, only the normal functioning of the recline cylinder functions to limit any further reclining of the seat back portion. The recline cylinder, however, is only structured to prevent reclining under the normal weight of an individual passenger sitting in the seat, and up to a 9 G load which was the maximum required load under the old FAA regulations. As such, conventional designs, which incorporate only a recline cylinder, are not able to resist the increased reclining test load as exerted under the latest FAA dynamic test requirements.

Accordingly, there is a substantial need in the art to provide a solution to this newly identified problem in the art relating to aircraft passenger seat construction, and in particular custom, aft facing, aircraft passenger seat construction. The device of the present invention functions to provide the needed reinforcement without adding substantial weight or cost to the aircraft seat construction.

SUMMARY OF THE INVENTION

The present invention is directed towards a recline safety lock assembly which is to be used in an aircraft passenger seat. Generally the aircraft passenger seat is of the type which includes a reclining seat back portion, with a pair of spaced side rails, a seat foundation portion, with a pair of spaced seat side rails to which the side rails of the seat back portion are secured, and at least one recline cylinder. The recline cylinder is generally secured to one of the seat side rails, forward of a corresponding one of the side rails, and is structured to secure the seat back portion in one of a plurality of reclined orientations relative to the seat foundation portion. The reclined orientation is maintained under the normal weight of a passenger sitting in the seat.

Specifically, the recline safety lock assembly of the present invention includes at least one lock plate. The lock plate includes an upper mount portion which is structured to be mounted on a side of one of the side rails of the seat back portion. Additionally, the lock plate includes an engagement end. The engagement end includes a downwardly depending lip formed therein.

Also included in the recline safety lock assembly of the present invention is at least one lock pin. The lock pin is structured to be axially mounted adjacent the engagement end of the lock plate so as to be able to rotate between an engaged orientation and a disengaged orientation. Further, the lock pin includes a main shaft having a transverse notch formed therein. As such, the disengaged orientation of the lock pin includes the transverse notch in the main shaft of the lock pin disposed in a generally horizontal orientation. Accordingly, the disengaged orientation permits the free passage of the downwardly depending lip of the lock plate therethrough. Conversely, the engaged orientation of the lock pin includes the transverse notch in the main shaft of a lock pin disposed in an upwardly angled direction. As such, the lock pin will engage the downwardly depending lip of the engagement end of the lock plate.

Preferably, the lock pin will move into the engaged orientation upon the seat back portion being disposed in a generally upright orientation relative to the seat foundation portion. Accordingly, the lock pin functions to prevent rear reclining of the seat back portion relative to the seat foundation portion under a substantial load such as that associated with FAA test requirements. Finally, controlled means are included to maintain the lock pin normally in the engaged orientation, and to permit temporary rotation of the lock pin into the disengaged orientation when reclining is desired.

It is an object of the present invention to provide a recline safety lock assembly to prevent rear reclining of a seat back portion of an aircraft passenger seat under a substantial load.

It is also an object of the present invention to provide a recline safety lock assembly to prevent rear reclining of the seat back portion of an aircraft passenger seat without substantially increasing an overall weight of the passenger seat and without substantially increasing the materials and manufacturing complexity of the aircraft passenger seat.

Also an object of the present invention is to provide a recline safety lock assembly structured to resist a substantial reclining load on a seat back portion of the passenger seat, and which does not require substantial supplemental locking mechanisms to secure the recline safety lock assembly in an engaged, locking orientation.

BRIEF DESCRIPTION OF THE DRAWINGS

For a fuller understanding of the nature of the present invention, reference should be had to the following detailed description taken in connection with the accompanying drawings in which:

FIG. 4 is a cross sectional view of the recline lock mechanism of the present invention illustrating the lock plate with the lock pin in a disengaged orientation;

FIG. 5 is a cross sectional view of the recline lock mechanism of the present invention illustrating the lock plate with the lock pin in an engaged orientation;

FIG. 6 is a trailing edge view of the lock pin of the present invention;

FIG. 7 is a leading edge view of the lock pin of the present invention;

FIG. 8 is a cross-sectional view of the lock pin of the present invention.

Like reference numerals refer to like parts throughout the several views of the drawings.

DETAILED DESCRIPTION OF THE PREFERRED EMBODIMENT

Figure 1:
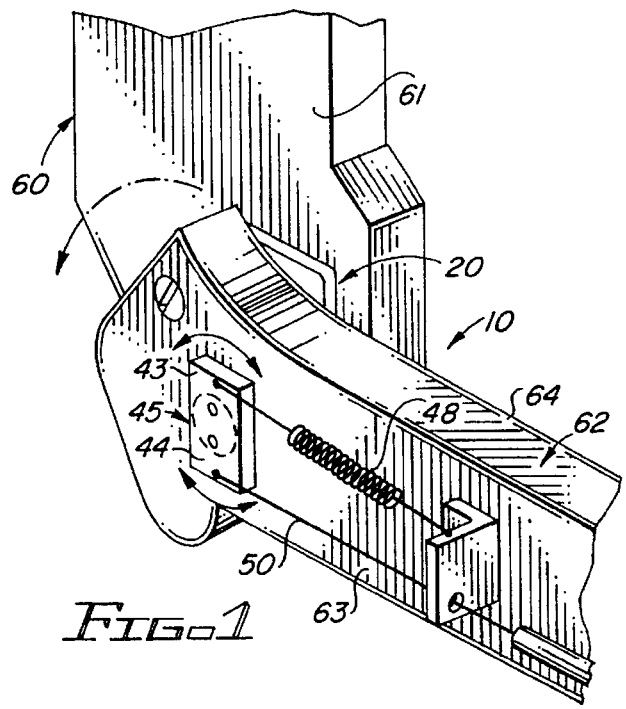
FIG. 1 is an isolated perspective view of the recline lock mechanism of the present invention.
Figure 1A:
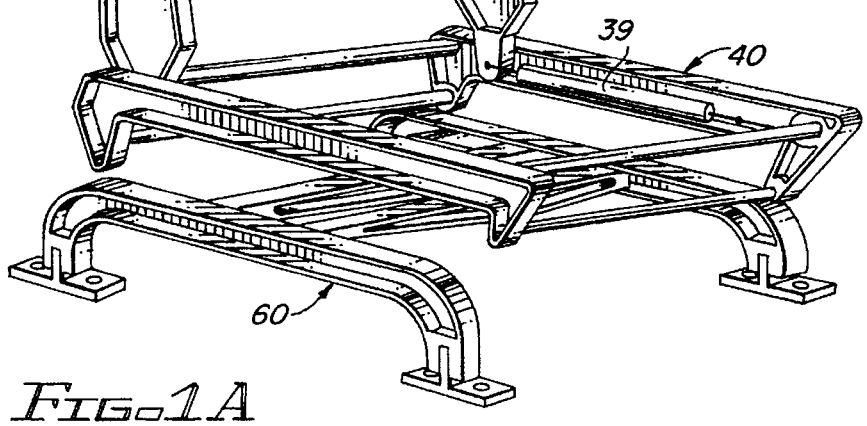
FIG. 1A is a perspective view of one type of aircraft passenger seat having a reclining seat back portion and a seat foundation portion, on which the assembly of the present invention will work.

Shown throughout the figures, the present invention is directed towards a recline safety lock assembly, generally indicated as 10, to be used in an aircraft passenger seat. As illustrated in FIG. 1A, an aircraft passenger seat will generally include a reclining seat back portion having a pair of spaced side rails 60, and a seat foundation portion having a pair of spaced seat side rails 62. Further, the reclinable aircraft seat will also normally include at least one recline cylinder, 70 as illustrated in FIG. 1. In use, the side rails 60 of the seat back portion are pivotally secured to the seat side rails 62 of the seat foundation portion so as to permit reclining and inclining movement of the seat back portion. It will be appreciated by those skilled in the art that recline cylinder 70 is conventional and utilizes a plunger type element which secures the seat back portion in one of a plurality of reclined orientations relative to the seat foundation portion, typically under the normal weight of a passenger sitting in the seat. Also, recline cylinder 70 is generally controlled by one or more control wires that a passenger can trigger by depressing a button which is typically located in the armrests of the aircraft seat. As has been explained, the FAA requires aircraft seats to undergo and pass rigorous impact tests. For example, one impact test will simulate the crash of a forward moving aircraft and in this scenario, an aircraft seat which faces forward will have substantial force exerted fundamentally upon the reclining seat foundation, tending to thrust same forward, as well as upon the seat foundation portion. For forward facing seats, the recline cylinder 70 acts to help the reclining seat back portion withstand loads exerted on the seat back portion during such crash testing. However, this is not the case for aft facing aircraft seats; when tested in a simulated crash of a forward moving aircraft, the forces at play tend to thrust the reclining seat portion backwardly, and as such, the recline cylinder 70 does not offer enough resistance for withstanding said forces. Consequently, the recline safety lock assembly 10 of the present invention is particularly well suited for operation in aft facing aircraft seats although it is structured to be incorporated into existing aircraft passenger seats, whether forward or aft facing.

As illustrated in FIGS. 1, 4 and 5, the recline safety lock assembly 10 of this invention includes at least one lock plate 20. The lock plate 20 is preferably a rigid, strong, generally flat plate, which most preferably will be made of a metallic material such as steel or high strength, lightweight aluminum. As shown in FIGS. 4 and 5, lock plate 20 includes primarily an upper mount portion 22 and an engagement end 26. The upper mount portion 22 of the lock plate 20 is structured to be mounted on a side 61 of one of the side rails 60 of the seat back portion which confronts the seat side rail 62, as shown in FIG. 1. Although only one lock plate may be implemented, in the preferred embodiment, and in order to fully withstand the increased FAA dynamic test loads, each of the side-rails 60 of the seat back portion will include one of the lock plates 20 mounted thereon.

As illustrated in FIGS. 4 and 5, the upper mount portion 22 of the lock plate 20 preferably includes a number of mount apertures 25 through which a bolt, screw, rivet or like fastener can be inserted to fully extend therethrough for securing the lock plate 20 to the side rail 60. Additionally, in the preferred embodiment the lock plate 20 may include an upper axis aperture 24 disposed at the pivot axis between the side rail 60 of the seat back portion and the seat side rail 62 of the seat foundation portion. Lock plate 20 further includes at engagement end 26, a downwardly depending lip 27. Upon a reclining movement of the side rail 60, and due to the location of the pivot axis generally above the engagement end 26 of the lock plate 20, such as at 24 or another point above the lock plate 20, the downwardly depending lip 27 at the engagement end 26 of the lock plate 20 pivots relative to the pivot axis and travels generally along the arrowed line A, depicted in FIGS. 4 and 5.

Also included in the recline safety lock assembly 10 of the present invention is at least one lock pin 30, illustrated in FIGS. 2–3 and 6–8. Preferably one lock pin 30 will be included for each of the lock plates 20 included in the aircraft seat assembly. The lock pin 30, which includes a main shaft 32, is rotatably and axially mounted adjacent the engagement end 26 of the lock plate 20, and preferably through the seat side rails 62 of the seat foundation portion. Also, a hub portion 40 of the lock pin 30 preferably protrudes through a side 63 of the seat side rail 62 while the main shaft portion 32 of the lock pin 30 protrudes through the opposite side 64 of the seat side rail 62.

Disposed in the main shaft 32 of the lock pin 30 is a transverse notch 31. This transverse notch 31 is defined by an interior segment 34 in the main shaft 32 of the lock pin 30. As depicted in FIGS. 6-8, the interior segment 34 include a top surface 35 that extends diametrically through a central axis of the lock pin 30 and defines the transverse notch 31 thereover. Additionally, in the preferred embodiment, the interior segment 34 of the lock pin 30 also includes a bottom surface 33 which defines a secondary notch 33' in the main shaft 32 of the lock pin 30. As such, the transverse notch 31 and the secondary notch 33' define a leading edge 36 of the interior segment 34 and trailing edge 37 of the interior segment 34. Preferably, as a result of the orientation of the secondary notch 33', the leading edge 36 will be narrower than the trailing edge 37 of the interior segment 34.

In use, the lock pin 30 is rotatably and axially mounted so as to be moveable between an engaged orientation and a disengaged orientation. Specifically, the disengaged orientation of the lock pin 30 includes top surface 35 of the interior segment 34, and accordingly the transverse notch 31, disposed in a generally horizontal orientation. As illustrated in the figures, because of this horizontal orientation of the transverse notch 31, and due to the normal path of travel of the downwardly extending lip 27 of the engagement end 26 of the lock plate 20 along line A, the downwardly depending lip 27 will freely pass through the transverse notch 31 while the lock pin 30 is in the disengaged orientation. As such, while in this disengaged orientation, the user may freely recline their seat back portion as desired.

Additionally, the lock pin 30 is structured to be disposed in the engaged orientation. In the engaged orientation the transverse notch 31 is disposed in a generally upwardly angled orientation such that the leading edge 36 of the interior segment 34 of the lock pin 30 engages the downwardly depending lip 27 of the engagement end 26 of the lock plate 20 in order to prevent rear reclining of the seat back portion. Preferably, only when the seat back portion of the aircraft passenger seat is moved to a generally upright orientation, relative to the seat foundation portion, will the lock pin 30 be able to move completely into the engaged orientation in order to prevent rear reclining. This, therefore, enables a user to freely recline the seat when desired.

Figure 2:
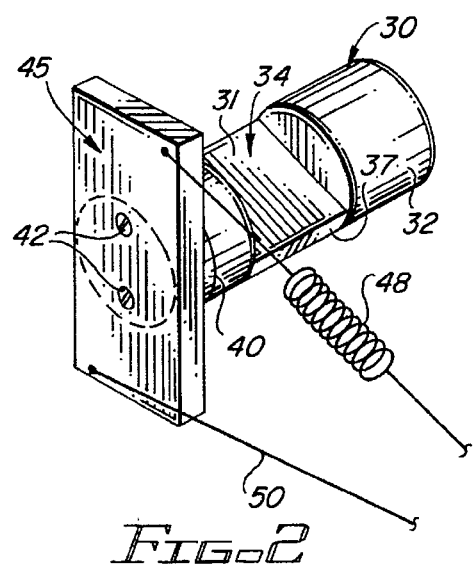
FIG. 2 is an isolated perspective view of the lock pin of the present invention in an engaging orientation.
Figure 3:
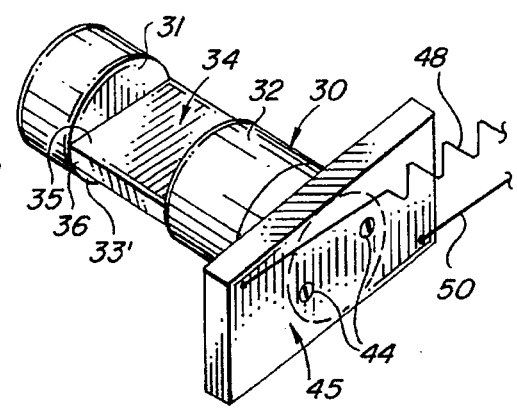
FIG. 3 is an isolated perspective view of the lock pin of the present invention in a disengaging orientation.

The recline safety lock assembly of this invention further includes control means in order to orient the lock pin 30 in either the engaged or disengaged orientations. Preferably, the control means maintain the lock pin 30 normally in the engaged orientation (corresponding an upright position of the seat back portion) while permitting temporary rotation of the lock pin 30 into the disengaged orientation (corresponding a reclining position of seat back portion). Turning to FIGS. 1-3, the recline safety lock assembly 10 of the present invention is seen to include a control plate 45 secured to the hub portion 40 of the lock pin 30. As such, the hub 40 of the lock pin 30 may include a pair of spaced apertures 41, seen in FIGS. 6 and 7, through which a pair of screws, bolts, rivets or like fasteners 42 extend in order to secure the control plate 45 to the hub 40 of the lock pin 30.

The control means of this invention preferably further include biasing means. As illustrated in FIG. 1, in a preferred embodiment, the biasing means are in the form of a spring 48, which is connected to the control plate 45 at an upper end 43 thereof. Spring 48 is connected to the control plate 45 and to the side 63 of the seat side rail 62 so as to normally urge the lock pin 30 into the engaged orientation. Conversely, disposed at an opposite side of the control plate 45 is a control wire 50. The control wire 50 is structured such that when it is pulled it will result in the rotation of the lock pin 30 into the disengaged orientation where it is maintained. Only, however, when the control wire 50 is being affirmatively pulled will the lock pin 30 be maintained fully in a disengaged orientation. Additionally, in the preferred embodiment, and so as to minimize the number of controls necessary in the aircraft seat, the control wire 50 may be connected to and/or otherwise split from the control wire that is utilized to control the recline cylinder and is actuated using a button or lever in the armrest of the overall seat assembly.

Turning specifically to the spring 48, it continuously tends to rotate the lock pin 30 towards the engaged orientation; however, in the preferred embodiment, only when the seat back portion is moved to its fully upright orientation will the leading edge 36 of the interior segment 34 of the lock pin 30 have sufficient clearance to engage the downwardly depending lip 27 on the engagement end 26 of the lock plate 20. Additionally, the leading edge 36 of the lock pin 30 preferably engages an upper edge 28 of the downwardly lip 27 in the lock plate 20. As such, due to the specific structure and configuration of the interior segment 34 of the lock pin 30, and its engagement at the upper edge 28 of the downwardly depending lip 27 of the lock plate 20, when a rear reclining load is exerted on the seat back portion so as to tend to recline the seat back portion about the pivot axis, as at 24, the load translated through the lock plate 20 is focused into the leading edge 36 of the interior segment 34 of the lock pin 30. Further, because the leading edge 36 of the interior segment 34 of the lock pin 30 extends diametrically across the lock pin 30, the load is exerted diametrically across the lock pin and does not have enough tangential force to rotate the lock pin 30 to disengage the locking mechanism. Rather, all of the load exerted by the lock plate 20 on the lock pin 30 is in a shearing direction wherein the strength of the lock pin 30 and the material construction thereof counteract the load. Accordingly, the specific and balanced configuration of the interior segment 34 in the lock pin 30 provides for the elimination of substantial additional lock or engagement segments to secure the lock pin 30 in an engaged orientation. Further, because of the generally small size of the overall assembly, and the lock pin 30 in particular, it does not require significant adaptation of the aircraft seat frame in order to provide sufficient mounting space.

While this invention has been shown and described in what is considered to be a practical and preferred embodiment, it is recognized that departures may be made within the spirit and scope of this invention which should, therefore, not be limited except as set forth in the claims which follow and within the doctrine of equivalents.

What is claimed is:

1. To be used in an aircraft passenger seat of the type including a reclining seat back portion having a pair of spaced side rails, a seat foundation portion having a pair of spaced seat side rails to which the side rails of the seat back portion are secured, and at least one recline cylinder secured to one of the seat side rails forward of a corresponding one of the side rails and structured to secure the seat back portion in one of a plurality of reclined orientations relative to the seat foundation portion under the normal weight of a passenger sitting in the seat, a recline safety lock assembly comprising:

at least one lock plate, said lock plate including an upper mount portion structured and disposed to be mounted on a side of one of the side rails of the seat back portion, said lock plate further including an engagement end, said engagement end including a downwardly depending lip, at least one lock pin, said lock pin including a main shaft having a transverse notch formed therein, said lock pin being rotatably and axially mounted adjacent said engagement end of said lock plate and including an engaged orientation and a disengaged orientation, said disengaged orientation of said lock pin including said transverse notch in said main shaft of said lock pin disposed in a generally horizontal orientation so as to permit the free passage of said downwardly depending lip of said engagement end of said lock plate therethrough, said engaged orientation of said lock pin including said transverse notch in said main shaft of said lock pin disposed in a generally upwardly angled orientation such that said lock pin engages said downwardly depending lip of said engagement end of said lock plate, upon the seat back portion being in a generally upright orientation relative to the seat foundation portion, so as to prevent rear reclining of the seat back portion relative to the seat foundation portion under a substantial load, and control means structured to maintain said lock pin normally in said engaged orientation, and to permit temporary rotation of said lock pin into said disengaged orientation.

2. A recline safety lock assembly as recited in claim 1 wherein said control means includes a control wire secured to an exterior surface of said lock pin and biasing means secured to a point on said exterior surface of said lock pin opposite a connection point of said control wire to said exterior surface of said lock pin, pulling of said control wire resulting in rotation of said lock pin into said disengaged orientation and release of said wire resulting in said biasing means rotating said lock pin into said engaged orientation.

3. A recline safety lock assembly as recited in claim 2 wherein said control wire is connected to a recline cylinder control wire such that release of the recline cylinder also functions to move said lock pin to said disengaged orientation.

4. A recline safety lock assembly as recited in claim 1 wherein said lock pin is normally disposed in said engaged orientation by biasing means.

5. A recline safety lock assembly as recited in claim 1 wherein said lock pin includes an interior segment, said interior segment including a top surface extending diametrically through a central axis of said lock pin so as to define said transverse notch thereover.

6. A recline safety lock assembly as recited in claim 5 wherein said interior segment of said lock pin also includes a bottom surface structured to define a secondary notch in said lock pin and defining a leading edge of said interior segment and a trailing edge of said interior segment.

7. A recline safety lock assembly as recited in claim 6 wherein said leading edge of said interior segment of said lock pin is structured to engage an upper edge of said downwardly depending lip of said engagement end of said lock plate such that a force exerted by said lock plate on said lock pin, upon the seat back portion being urged in a recline direction, is directed into said leading edge of said interior segment and diametrically across said lock pin, thereby tending to shear said lock pin rather than rotate said lock pin.

8. A recline safety lock assembly as recited in claim 7 wherein said leading edge of said interior segment of said lock pin has a smaller thickness than said trailing edge of said interior segment of said lock pin.

9. A recline safety lock assembly as recited in claim 1 wherein said lock pin is axially mounted to one of the seat side rails of the seat foundation.

10. A recline safety lock assembly as recited in claim 9 wherein each of the side rails of the seat back portion includes one of said lock plates secured thereto and each of the seat side rails of the seat foundation includes on of said lock pins mounted therein.

* * * * *